United States Patent [19]

Stenudd

[11] 4,264,833
[45] Apr. 28, 1981

[54] STEPPING MOTOR

[75] Inventor: Sven G. V. Stenudd, Lidingö, Sweden

[73] Assignee: Facit Aktiebolag, Atvidaberg, Sweden

[21] Appl. No.: 963,182

[22] Filed: Nov. 24, 1978

Related U.S. Application Data

[63] Continuation-in-part of Ser. No. 593,729, Jul. 7, 1975.

[30] Foreign Application Priority Data

Jul. 8, 1974 [SE] Sweden .............................. 7408952

[51] Int. Cl.³ ............................................. H02K 37/00
[52] U.S. Cl. ................................. 310/49 R; 310/114; 310/268
[58] Field of Search ................... 310/49, 40 MM, 112, 310/114, 261, 262, 264, 265, 268, 269, 254, 258, 259, 162–164

[56] References Cited

U.S. PATENT DOCUMENTS

| | | | |
|---|---|---|---|
| 2,797,346 | 6/1957 | Ranseen | 310/49 |
| 3,005,118 | 10/1961 | Ranseen | 310/49 |
| 3,372,291 | 3/1968 | Lytle | 310/49 |
| 3,469,123 | 9/1969 | Inaba | 310/49 |
| 3,801,842 | 4/1974 | Touchman | 310/49 |

FOREIGN PATENT DOCUMENTS 2022750 11/1971 Fed. Rep. of Germany ............. 310/49

Primary Examiner—R. Skudy
Attorney, Agent, or Firm—Alfred E. Miller

[57] ABSTRACT

A stepping motor having at least one stator with circularly disposed and equally interspaced poles. A rotor is provided which coacts with the stator and is rigidly connected to a rotatable shaft. The rotor has a number of teeth which corresponds to the number of stator poles, however the pole faces of the rotor teeth are of a different form and size than the pole faces of the stator poles whereby the torque generating intersecting line between the pole faces of the stator poles and the rotor teeth is lengthened when the rotor moves in over a stator pole and shortened when the rotor teeth leaves the stator pole.

4 Claims, 4 Drawing Figures

STEPPING MOTOR

The present invention is a continuation-in-part of Ser. No. 593,729 filed July 7, 1975.

BACKGROUND OF THE INVENTION

Stepping motors are known having several pairs of stators and rotors designed for axial flux. In these constructions the pole faces of the stator poles and the rotor teeth respectively are of equal configuration and size. Thus, the length of the torque generating intersecting line remains the same throughout that part of the rotor movement during which each of the rotor teeth are above the respective stator pole. Furthermore, stepping motors of the known type must be constructed so that there is some phase displacement between the driving magnetic stator field and the rotor movement. In some cases, this phase displacement is caused by rotor slip or lag due to increasing load. At comparatively low stepping frequencies no problems are encountered with a small phase displacement, however at high stepping frequencies serious problems arise in that phase displacement at high stepping frequencies may cause the motor to stop operating, or even reverse its direction of movement.

SUMMARY OF THE INVENTION

It is an object of the present invention to provide a stepping motor constructed in a manner which provides for a high degree of phase displacement when the stepping frequency is high. The object is carried out by constructing the pole faces of the stator poles and pole faces of the rotor teeth in such a manner that the torque generating intersecting line between a stator pole and a rotor tooth is lengthened successively when the rotor tooth moves in over a stator pole, and is shortened successively when the rotor tooth moves in a direction away from the stator pole. The expression "torque generating intersecting line" is used in the present context to refer to the length of overlap of a stator pole and a rotor tooth perpendicular to both the direction of flux flow between the stator pole and rotor tooth and the direction of relative movement of the stator pole and rotor tooth.

A further object of the present invention is to provide a stepping motor of the type described above in which a higher degree of displacement can be achieved at the same time that the stepping frequency is high.

Another object of the present invention is to provide a stepping motor arrangement having three pairs of stator and rotor elements which are disposed along a rotor shaft. The rotors are angularly displaced relative to one another whereby the angle of displacement is one-third of the tooth pitch of the rotor. The point to which the front and rear edge portions of the pole faces are directed for each rotor tooth is selected so that on simultaneous magnetization of two stators a torque characteristic is obtained of generally the same form as the characteristic obtained on separate magnetization of one stator.

The invention will now be more fully described with reference to the accompanying drawings, as follows.

DESCRIPTION OF THE PREFERRED EMBODIMENTS

Figure 1:
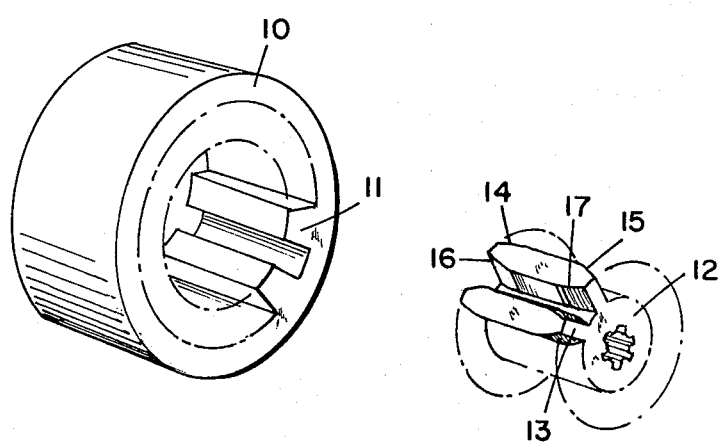
FIG. 1 is an exploded perspective view of a stator and rotor pair of a stepping motor constructed and arranged for radial flux in accordance with the teachings of the present invention.

Referring to FIG. 1 in which is seen a stator and corresponding rotor for a stepping motor that is constructed and arranged for radial flux. It will be noted that an annular stator 10 is shown having stator poles 11 directed radially inwards. The stator coacts with a rotor 12 that is mounted and arranged to rotate inside the stator in any suitable manner. The rotor 12 is provided with poles in the form of teeth 13, the number of which corresponds to the number of stator poles 11. Furthermore, it will be observed that the pole faces of each of the stator poles 11 are of a generally rectangular form while the pole faces of each of the rotor teeth are of a form, which, when viewed radially inwardly can be described as a rectangle with isosceles parallel trapezoids at the long and opposite sides of the rectangle forming mirror images of one another. The isosceles sides of each parallel trapezoid are formed by angular edge lines 14, 15 and 16, 17 respectively. Because of the present construction and arrangement the torque generating intersecting lines between the pole faces of the stator pole and the corresponding rotor tooth is lengthened when the rotor moves in a direction so as to be placed over the corresponding stator pole and is shortened when the rotor tooth moves further and away from the stator pole. The effect that is achieved by the present construction and arrangement can be compared to the meshing effect of two gear wheels. Thus, when a pole face of a rotor tooth is positioned exactly over a corresponding stator pole, the edge lines which are perpendicular to one another, define the pole face of the rotor tooth and coincide with the corresponding edge lines of the pole face of the stator pole. Because of the foregoing structure and arrangement, the stop positions of the rotor will be defined precisely.

Figure 2:
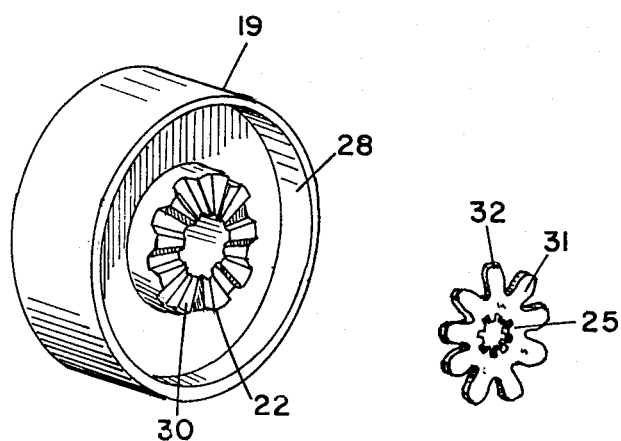
FIG. 2 is an exploded perspective view of another embodiment of the invention showing a stator half with its coacting rotor constructed and arranged for axial flux.

FIG. 2 shows an alternate embodiment of the present invention in which the stator and rotor are constructed and arranged for axial flux. This structure has certain advantages over the embodiment of FIG. 1 in that the pole faces of the rotor can be made larger than the structure illustrated in FIG. 1, and at the same time the rotor can be made very thin. The desirable results of the construction of FIG. 2 is that a large pole face permits greater torque and the relatively thin rotor has the advantage of a small moment of inertia.

Figure 4:
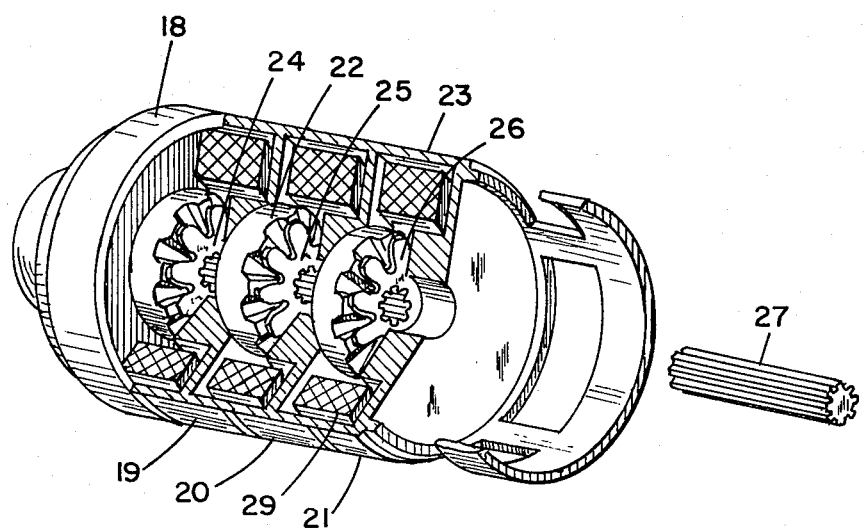
FIG. 4 is a diagrammatic perspective section through a stepping motor having a plurality of stators and coacting rotors constructed and arranged in accordance with the teachings of the present invention.

As seen in FIGS. 2 and 4, the stepping motor includes three pairs of stators and rotors, each stator being formed by two halves 18, 19; 19, 20; and 20, 21. The stator halves 19 and 20 have dual sets of poles 22, and thus each can serve two stators. Moreover, annular spacers 23 are disposed between the stator halves so that the spaces for the rotors 24, 25, and 26 are formed between the halves of each stator. The rotors 24, 25 and 26 are fixed to a shaft 27, the ends of which are journalled in a suitable manner in the motor end caps or housing (not shown). As seen in FIG. 2, an annular space 28 is formed in each stator for accommodating a magnetizing coil 29 (FIG. 4).

Referring again to FIG. 2, the stator poles 22 of each stator half are positioned annularly around the center of the stator. The pole faces 30 of the stator poles form parts of a ring and are located in the same plane in each stator half. The teeth 32 which form the corresponding pole faces of the rotor poles are of generally the same form and size as the pole faces 30 of the stator poles. However, as clearly seen in FIG. 3, each tooth 32 has beveled lateral surfaces forming inclined edge lines 33 and 34 which, according to the teachings of the present invention, bring about an extension of the torque generating intersecting line between the pole faces of a stator and a rotor tooth, respectively, when a rotor tooth moves into a position over a stator pole, and a reduction of this line when the rotor tooth moves away from the stator pole.

Figure 3:
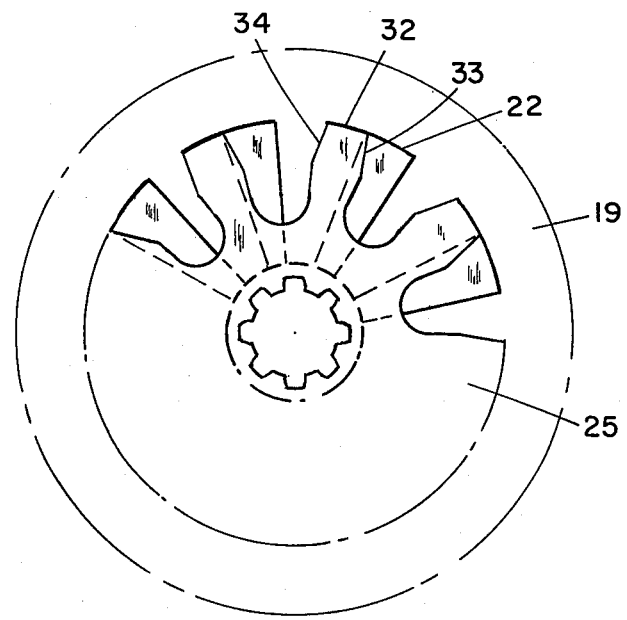
FIG. 3 is an enlarged diagrammatic plan view of a stator half with a coacting rotor in accordance with the illustration of FIG. 2.

It should be evident from FIG. 3, that the rotor 25 is in a position relative to the stator half 19 in which the inclined edge lines 33 of the rotor teeth 32 during the movement of the rotor teeth over the stator poles intersect a radial line delimiting the pole face 30 of the stator.

FIG. 4 illustrates a preferred embodiment of the invention in which rotors 24, 25 and 26 are located in such a way relative to each other that the teeth of each rotor are displaced one-third of the tooth pitch relative to the teeth of the other two rotors. However, the stator poles have the same circumferential positions in all of the three stators 18, 19; 19, 20; and 20, 21. As seen in FIG. 2, each rotor has nine teeth, so that with three rotors 27 stop positions are obtained for each complete revolution of the rotor shaft 27.

If it is desired to further increase the number of stop positions, the edge lines 33, 34 of each rotor tooth can be so inclined that the peripheral length of the rotor tooth corresponds to one-sixth of the tooth pitch. If two of the stators shown in FIG. 4 are magnetized simultaneously a torque characteristic results in which the form and size corresponds to the torque characteristic obtained by the separate magnetizing of one stator, thereby providing stop positions which are the so-called half steps, between the poles of the relevant stators. This arrangement increases the total number of stop positions or steps to $2 \times 27 = 54$. Furthermore, in the embodiment shown in FIG. 4, the sequence of magnetization of the three stators is as follows: 18, 19; 18, 19+19, 20; 19, 20+20, 21; 20, 21; 20, 21+18, 19, etc.

It should be apparent from the foregoing that a stepping motor constructed and arranged according to the teachings set forth hereinbefore results in a higher degree of phase displacement at high stepping frequencies.

What is claimed is:

1. A stepping motor comprising at least three stators, each one consisting of two halves having a plurality of annularly arranged and equally spaced pole faces, an axially disposed shaft, three rotors coacting with said stators and being fixed to said shaft, each of said rotors having a number of teeth which corresponds to the number of poles of the respective coacting stator, the pole faces of said stator halves facing each other with the teeth of the corresponding rotor passing between the pole faces of the said halves, each of said rotor teeth having bevelled lateral surfaces forming inclined edge lines of the tooth, and each pole face of said stator poles forms a part of a ring and are located in the same plane in each stator half, wherein one of said inclined edge lines during movement of the rotor tooth over the stator pole passes a radial line delimiting the stator pole surface and thus brings about a torque generating intersecting line between the pole surface and the rotor tooth, which line is lengthened successively during said movement.

2. A stepping motor as claimed in claim 1, wherein said rotors are angularly displaced relative to one another, the angle of displacement being approximately one-third of the tooth pitch of each of said rotors.

3. A stepping motor as claimed in claim 2, wherein a peripheral edge portion of the rotor tooth forms one-sixth of the tooth pitch of the rotor, the said edge portion corresponding to the exterior edge of said stator pole.

4. A stepping motor comprising at least three stators, each one consisting of two halves having a plurality of annularly arranged and equally spaced pole faces, an axially disposed shaft, three rotors coacting with said stators and being fixed to said shaft, each of said rotors having a number of teeth which corresponds to the number of poles of the respective coacting stator, the pole faces of said stator halves facing each other with the teeth of the corresponding rotor passing between the pole faces of the said halves, each of said pole faces having bevelled lateral surfaces forming inclined edge lines of the pole surface and each rotor tooth forming a part of a ring, wherein one of said inclined edge lines during movement of the rotor tooth over the stator pole passes a radial line delimiting the rotor tooth and thus brings about a torque generating intersecting line between the pole surface and the rotor tooth which line is lengthened successively during said movement.

* * * * *